United States Patent
Bosch

(10) Patent No.: US 10,644,362 B2
(45) Date of Patent: May 5, 2020

(54) BATTERY MODULE, METHOD FOR ITS OPERATION, AND ITS USE

(71) Applicant: Robert Bosch GmbH, Stuttgart (DE)

(72) Inventor: Andreas Bosch, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/217,305

(22) Filed: Dec. 12, 2018

(65) Prior Publication Data
US 2019/0181511 A1  Jun. 13, 2019

(30) Foreign Application Priority Data

Dec. 12, 2017  (DE) .................. 10 2017 222 444

(51) Int. Cl.
| | | |
|---|---|---|
| *G01L 5/00* | (2006.01) | |
| *H01M 10/48* | (2006.01) | |
| *G01L 5/24* | (2006.01) | |
| *H01M 10/42* | (2006.01) | |
| *H01M 2/10* | (2006.01) | |
| *F16B 31/02* | (2006.01) | |

(52) U.S. Cl.
CPC .......... *H01M 10/482* (2013.01); *F16B 31/02* (2013.01); *G01L 5/246* (2013.01); *H01M 2/1077* (2013.01); *H01M 10/425* (2013.01); *F16B 2031/022* (2013.01)

(58) Field of Classification Search
CPC ............ H01M 10/482; H01M 2/1077; H01M 10/425; F16B 31/02; F16B 2031/022; G01L 5/246

USPC ............................................. 73/761
See application file for complete search history.

(56) References Cited

U.S. PATENT DOCUMENTS

| | | | |
|---|---|---|---|
| 2004/0179918 A1 | 9/2004 | Kersten | |
| 2008/0085148 A1* | 4/2008 | Leahy ................ | E01F 9/635 403/2 |
| 2009/0116962 A1* | 5/2009 | Pedersen ............ | F03D 7/02 416/31 |
| 2010/0005663 A1* | 1/2010 | Monville ............ | B23P 19/067 29/898.09 |
| 2013/0000245 A1* | 1/2013 | Tarr .................... | F03D 17/00 52/745.21 |
| 2017/0084892 A1* | 3/2017 | Lee .................... | H01M 2/1077 |

FOREIGN PATENT DOCUMENTS

| | | |
|---|---|---|
| CN | 105115652 | 12/2015 |
| DE | 202013010307 | 12/2013 |
| DE | 102012020438 A1 | 4/2014 |
| DE | 202016106885 U1 | 2/2017 |

* cited by examiner

*Primary Examiner* — Max H Noori
*Assistant Examiner* — Masoud H Noori
(74) *Attorney, Agent, or Firm* — Michael Best & Friedrich LLP

(57) ABSTRACT

A battery module containing a plurality of battery cells electrically connected to one another in series or in parallel, two contact surfaces (14a, 14b) for the purposes of tapping off a module voltage of the battery module (10) and at least one bolted joint device (22) for the purposes of fixing a component (12), in particular a current-conducting component, of the battery module (10), wherein the at least one bolted joint device (22) is provided with a sensor (26) for the purposes of determining a preload force applied to the bolted joint device (22).

18 Claims, 3 Drawing Sheets

BATTERY MODULE, METHOD FOR ITS OPERATION, AND ITS USE

BACKGROUND OF THE INVENTION

The present invention relates to a battery module, a method for its operation, and its use.

In battery modules or battery packs, a plurality of battery cells is usually connected to one another in an electrically conducting manner. Here high-voltage batteries, in particular, sometimes contain safety-critical or function-critical bolted joints. The preload force applied, and in particular the maintenance of the latter over the service life of such a high-voltage battery, is a critical factor for the safe operation of such a high-voltage battery. Conventionally, standardized or also non-standardized safety elements such as, for example, encapsulated adhesives, are used to secure bolted joints. In the case of bolted joints for electrical high-current or high-voltage connections, however, such conventional bolted joint safety elements from the mechanical engineering sector often cannot be used. This applies in the field of battery modules, for example, to the bolted joints of terminals of lithium-ion battery cells, with, for example, appropriate cell connectors or battery module connectors within a battery pack.

In DE 20 2013 010 307 U1, US 2004/0179918 and CN 105115652 devices can be found that can be used to determine the quality of a bolted joint or its change in length, on the basis of an ultrasound measurement method.

This can be used, for example, to determine the preload force or clamping force on a connecting component.

SUMMARY OF THE INVENTION

The particular advantage of the inventive battery module is that the quality of the bolted joints, that serve to fix current-conducting components within the battery module, can be tested without, for example, having to open a housing of the battery module, or disassemble parts of a battery. For this purpose, the battery module, in addition to a plurality of battery cells electrically connected to one another in series or in parallel, and relevant contact surfaces for tapping off a battery module voltage provided, has a bolted joint device for the purposes of fixing electrically-conducting components of the battery module which, in accordance with the invention, is in turn provided with a sensor for the purposes of determining the preload force applied to the bolted joint device.

With the aid of this sensor, the quality of the corresponding bolted joint can be checked either continuously or periodically by determining the preload force applied to the bolted joint device, without the need for the battery module, or a battery containing the battery module, or a corresponding battery pack, to be taken out of operation and completely or partially disassembled. As soon as the said check shows that the preload force on the bolted joint device falls below a predefined lower threshold value, preventive measures can be taken in a timely manner to maintain the bolted joint, or to replace individual components of the bolted joint in question.

Furthermore, it is possible in this way to embody critical bolted joints, for example in the high-current circuit of a battery module or a battery pack of a battery, in a detachable form without having to provide permanent bolted joint safety elements, for example with the use of adhesive. This enables the replacement in a simple manner of components of a battery module, without having to replace larger subsystems of a battery module or battery pack. This leads to considerable cost savings, for example in the event of repairs or maintenance.

Thus it is advantageous if the sensor for the purposes of determining a preload force applied to the bolted joint device is an ultrasound sensor. This is positioned, for example, with its sound-generating and/or sound-measuring unit in physical, in particular in planar, contact with a surface of the bolted joint device. This enables a constructively simple and reliable determination of the preload force applied to the bolted joint device.

In accordance with another advantageous embodiment, the current-carrying components take the form, for example, of cell connectors that connect two in particular adjacent battery cells of the battery module electrically with each other, of a bus bar, or of contact surfaces forming end terminals of the battery module. These components are embodied in aluminum or copper, for example. Due to the use of soft materials, critical creep or setting processes on a relevant fixation by means of the bolted joint device occur more quickly than is the case with harder materials such as steel. Preferably continuous monitoring of the preload force on a relevant bolted joint is particularly useful in this case.

In accordance with a particularly preferred embodiment of the present invention, the battery module also has a battery control unit, which is connected to the sensor by way of a relevant data line in a signal-conducting connection. The battery control unit has means for determining a currently present preload force on the bolted joint on the basis of measurement signals received from the sensor and on the basis of a characteristic map comprising possible sensor signals and correlated values of a corresponding preload force on a bolted joint, associated with the bolted joint device. The advantage of this arrangement is that the signal processing and evaluation can be carried out spatially separated from the bolted joint and takes place within a battery control unit, which can be used for further sensor evaluations, for example in the context of monitoring the current battery temperature or the current voltage level.

The inventive battery module and the inventive procedure for its operation can be used advantageously with so-called high-voltage batteries, which have an operating voltage of >48 volts, in particular >48 volts. Such batteries are used, for example, in mobile systems such as electric vehicles or hybrid vehicles.

In addition, the inventive battery module and the inventive method can be used profitably for all low-voltage batteries with an operating voltage of <60 V, which are subjected to high currents in so-called boost-recuperation systems, for example. Such batteries are used, for example, in mobile systems such as hybrid vehicles, e.g. those that fall into the 'mild hybrid' category. In such systems, loosened electrical connections can lead to inadmissibly high temperatures and thus to damage to the contact surfaces, or even to premature failure of the system.

BRIEF DESCRIPTION OF THE DRAWINGS

Advantageous embodiments of the present invention are shown in the figure and explained in more detail in their following descriptions. Here.

DETAILED DESCRIPTION

Figure 1:
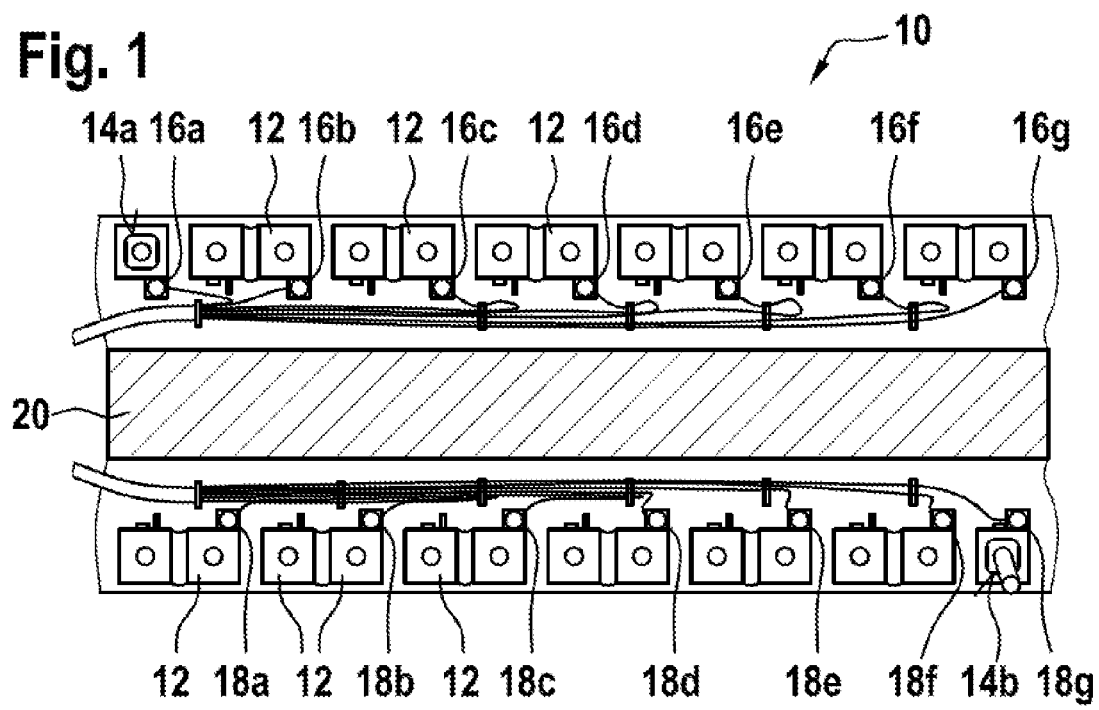
FIG. 1 shows a schematic plan view onto an inventive battery module in accordance with a first embodiment of the present invention.

FIG. 1 shows schematically a battery module 10 in accordance with a first embodiment of the present invention. The battery module 10 comprises a plurality of battery cells electrically connected to each other in parallel or in series. These battery cells are electrically conductively connected to each other by way of cell connectors 12. For this purpose the cell connectors 12 are, for example, welded to corresponding terminals (not shown in FIG. 1) of the battery cells. A possible voltage tap-off at the battery module 10 takes place, for example, by way of first and second module terminals, or first and second contact surfaces 14a, 14b of the battery module 10. A current-conducting connection can be made, for example, by way of the first or second contact surfaces 14a, 14b, with other adjacent battery modules (not shown here). For this purpose, bus bars (not shown here) can be connected to the first or second contact surface 14a, 14b by means of a bolted joint.

Furthermore, the battery module 10 comprises first sensor connections 16a-16g and second sensor connections 18a-18g. The first and second sensor connections 16a-16g, 18a-18g are, for example, connected in a signal-conducting manner to a battery control unit (not shown here), or to a sensor control unit 20, also known as a control sensor circuit (CSC), positioned in particular centrally on the battery module 10. In particular, the latter serves to determine the temperature or voltage of the individual battery cells of the battery module 10 for monitoring purposes.

Figure 2:
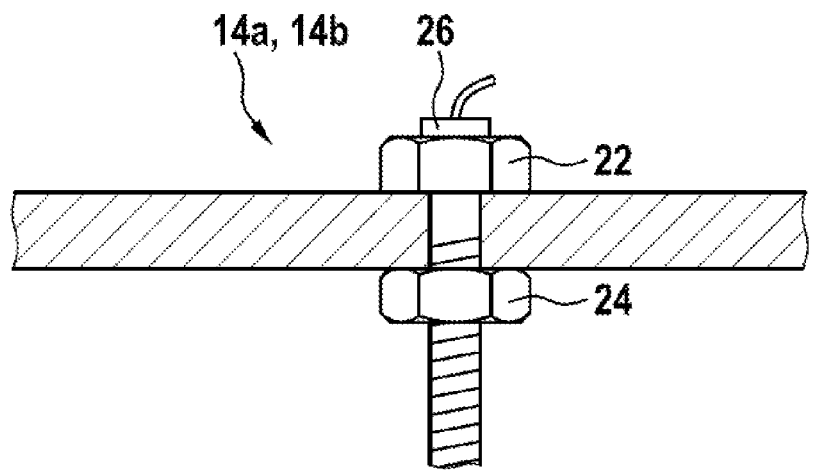
FIG. 2 shows a detail of the battery module shown in FIG. 1 in a schematic cross-sectional view.

The first and second contact surfaces 14a, 14b are shown in detail in the following FIGS. 2 to 4. Here the same reference symbols designate the same components as in FIG. 1.

Thus the first and second contact surfaces 14a, 14b each respectively preferably comprise a bolted joint device 22 in the form of a screw. This is locked in place, for example, by an appropriate nut 24. A sensor 26 is mounted on the head surface of the screw on the side of the latter remote from the shank to determine a preload applied to a bolted joint, produced by means of the bolted joint device 22. The sensor 26 can take the form of an ultrasound sensor whose sound-generating element is, for example, in physical, preferably planar, contact with the head surface of the bolted joint device 22. Here the sensor could, for example, take the form of a sensor as described in DE 20 2013 010 307 U1.

When in operation, the sensor 26 transmits ultrasound signals in the longitudinal direction of the bolted joint device 22 and registers the corresponding echo signals. On the basis of the echo signals, the length of the bolted joint device 22 can be determined exactly. Depending on the preload force applied to the bolted joint device 22, an extension of the bolted joint device 22 occurs. By determining the actual length of the bolted joint device 22, the preload force currently applied to the bolted joint device 22 can therefore be deduced relatively precisely. This enables the correlation of different values for the preload force applied to the bolted joint device 22 with the resulting longitudinal elongation of the bolted joint device 22, for example in the form of a characteristic map.

Since, in addition to the occurrence of a preload force on the bolted joint device, the temperature prevailing at the same time on the bolted joint device 22 also has an influence on the longitudinal extension of the bolted joint device 22 present at this time, the temperature present at this time is preferably taken into account when calculating the preload force on the basis of the current longitudinal extension of the bolted joint device 22. In this way, a characteristic map can be generated, which correlates the current longitudinal extension of the bolted joint device 22 with a correspondingly applied preload force as well as with different temperatures. The temperature can, for example, be recorded by way of the first and second sensor connections 16a-16g, 18a-18g in conjunction with an appropriate battery control unit or the sensor control unit 20.

Figure 3:
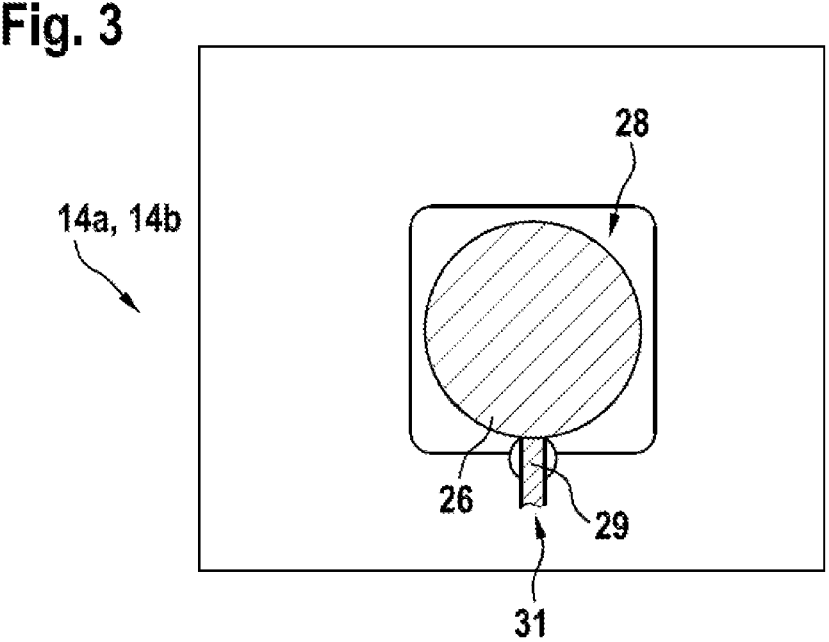
FIG. 3 shows a schematic representation of a second detail of the battery module shown in FIG. 1 in accordance with a second embodiment.

FIG. 3 shows an enlarged further detail of the battery module 10 in accordance with a second embodiment. Here this takes the form of a plan view of the lower face of the first or second contact surface 14a, 14b. While the first contact surface 14a is, for example, made of aluminum, the second contact surface 14b is preferably embodied in copper. A steel bolt 28 is pressed into the first or second contact surface 14a, 14b, for example, as the bolted joint device 22, wherein the sensor 26 for determining the preload force applied to the steel bolt 28 is embodied in a planar manner on its upper surface. The sensor 26 can be mounted in a planar manner on the surface of the steel bolt 28, or positioned in a recess of the same.

An appropriate power supply for the sensor 26, and a connection for the removal of relevant sensor data take place, for example, by way of a power and data cable 29. This is led, for example, from a lower face of the first and second contact surfaces 14a, 14b, through an opening 31, onto its upper face.

Figure 4:
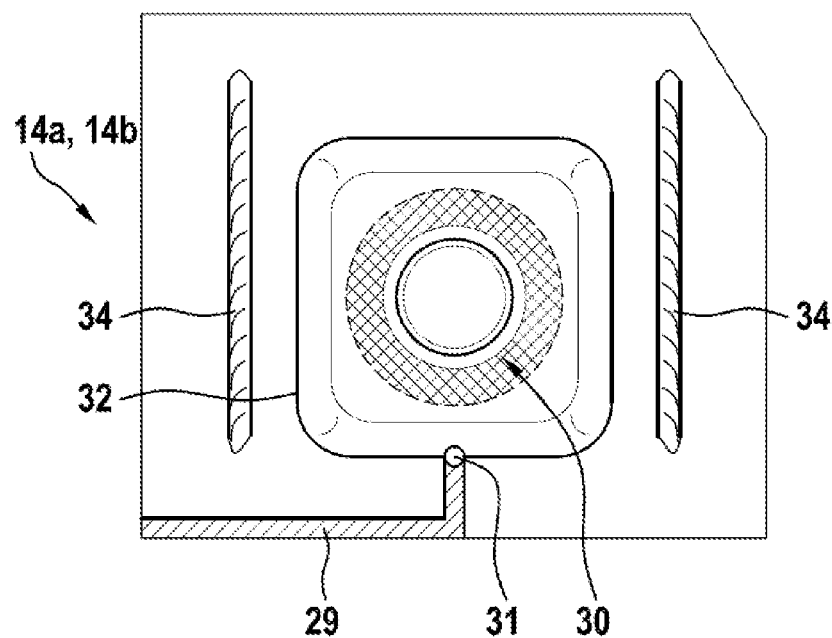
FIG. 4 shows a schematic representation of a third detail of the battery module shown in FIG. 1.

In FIG. 4, the first and second contact surfaces 14a, 14b are shown in a plan view, which at the same time represents an enlargement of the view of the first and second contact surfaces 14a, 14b shown in FIG. 1. FIG. 4 shows a shank 30 of the threaded bolt 28, and a bead 32 of the first and second contact surfaces 14a, 14b, which is formed when the bolt is pressed into the latter. The lower face of the contact surface 14a, 14b, for example, is connected in an electrically conducting manner to the end terminals (not shown here) of appropriate battery cells by means of laser welding seams 34, shown here schematically.

Figure 5:
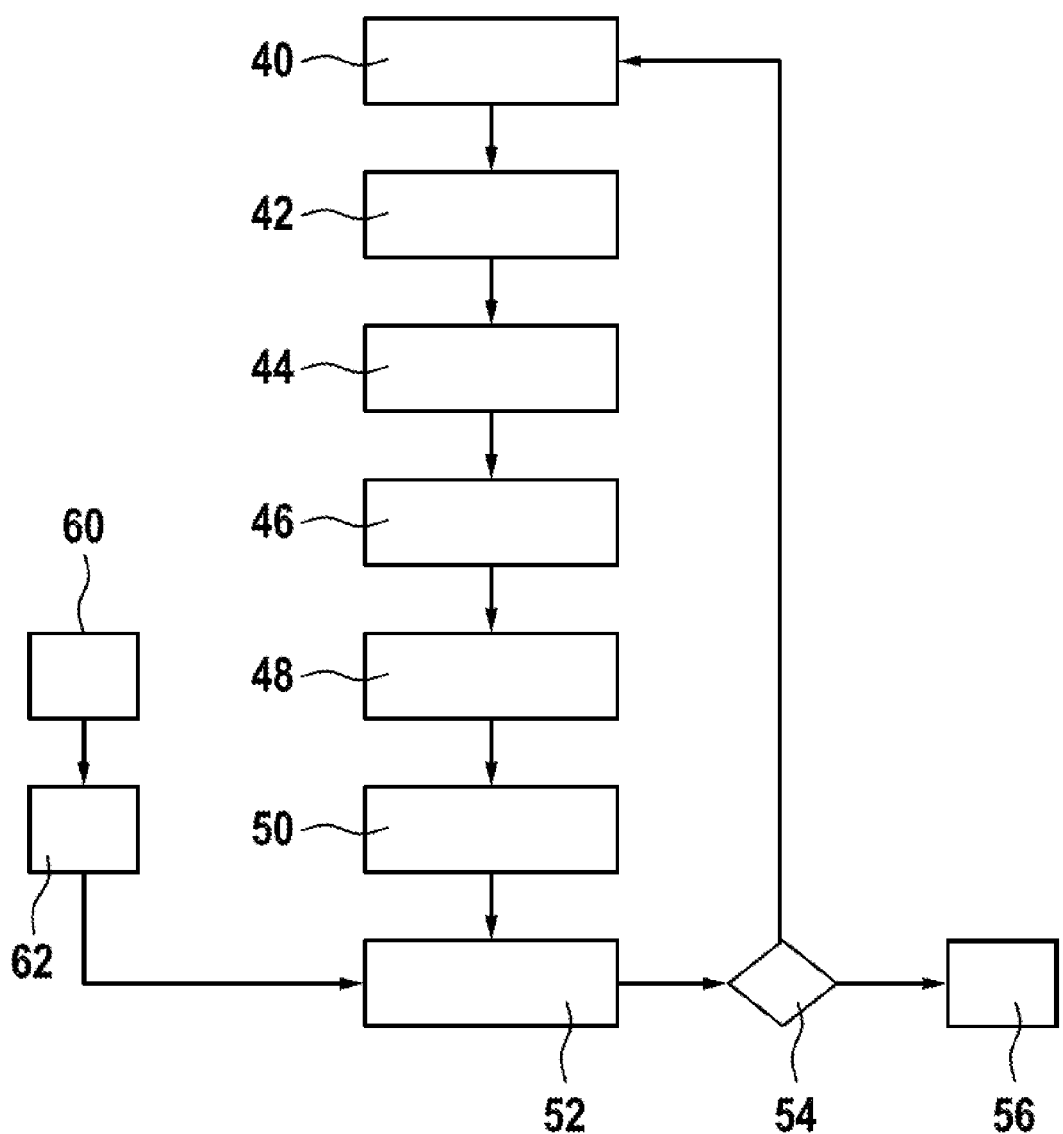
FIG. 5 shows a schematic representation of a flow chart of an inventive method for the operation of the inventive battery module.

FIG. 5 shows an example of an inventive method for operating an inventive battery module in accordance with FIGS. 1 to 4. In a first step 40, the transit time of an ultrasound pulse emitted by the sensor 26 into the bolted joint device 22 is determined. The measurement signal thereby obtained, which in particular is an analogue signal, is transmitted to the sensor control unit 20 in a second step 42. Within the sensor control unit 20, the analogue measurement signal is converted into a digital measurement signal in a third step 44.

In a fourth step 46 the digital sensor signal is, for example, combined with a unique identifier for the sensor 26 from which the corresponding measurement signal originates. This takes the form, for example, of a data matrix code (DMC). In a fifth step 48 the digital measurement signal, provided with an identifier, is, for example, transmitted to an appropriate battery control unit, for example, by way of a data bus in the form of a daisy chain, a CAN bus or a LYN bus. There, in a sixth step 50, the transmitted transit time signal, which represents the length of the transit time of the ultrasound pulse of the sensor 26 through the bolted joint device 22, is converted into a currently calculated longitudinal extension of the bolted joint device 22.

A comparison is then made between the calculated longitudinal extension of the bolted joint device 22 and a characteristic map stored in the battery control unit, so as to determine in a seventh step 52 a preload force that correlates with the current longitudinal extension of the bolted joint device 22. In a subsequent eighth step 54 a check is made as to whether the preload force determined falls below a predefined threshold value of a still permissible preload force or not.

If this preload force does not fall below this threshold value, the inventive method is restarted with the initiation of the first step 40. If the preload force falls below a permissible preload force or a corresponding warning threshold, a fault or warning message is issued in a final step 56, for example, or the battery module 10 is switched off, and discharged by means of a discharge device, or bypassed electrically by way of a bypass circuit. In addition to the output of a suitable fault message, an entry can alternatively or additionally be stored in a fault memory of the battery control unit.

In order to take into account the different temperature conditions that may prevail in the battery module 10 when determining the preload force, in an optional further first step 60 a temperature signal is generated by the sensor control unit 20 on the basis, for example, of the temperature values determined by means of the sensor control unit 20, which can be assigned to the individual battery cells of the battery module 10, and in a further second step 62 this signal is transmitted to the battery control unit.

This temperature value is, for example, taken into account in the context of a seventh step 52, in the determination of the preload force applied to the bolted joint device 22. This is based on the recognition that the longitudinal extension of the bolted joint device 22 determined by the sensor 26 can be attributed both to the preload force applied and to the temperature present on the bolted joint device 22 at this point in time. If the change in the longitudinal extension of the bolted joint device 22 attributable to the influence of temperature is eliminated in a calculation from the total change in the longitudinal extension of the bolted joint device 22, there remains a change in the longitudinal extension of the bolted joint device 22 that is due to a change in the preload force applied to the latter. In the eighth step 54, this is used as the basis for a comparison with the threshold value of a still permissible preload force.

To create an appropriate characteristic map, a calibration is performed, for example, for each sensor 26 or for each bolted joint produced by means of the bolted joint device 22. In this context, the longitudinal extension of the bolted joint device 22 which is present in the meantime is determined by means of the sensor 26 and stored in the characteristic map for different temperature conditions, and with the application of very diverse preload forces to the bolted joint device 22. In particular the calibration takes place after the mounting of the sensor 26 and the bolted joint device 22.

The characteristic map therefore takes the form of a stress/strain characteristic map, or a ternary stress/temperature/strain characteristic map. Depending on the diagnostic concept, the bolted joints can be measured either periodically during operation of the battery module 10 and/or a vehicle in which it is fitted, or during a start-up or run-down of a corresponding battery control unit, for example in the case of a parked vehicle fitted with the battery module 10. It is also possible to measure the bolted joints, for example, at a point in time at which the battery control unit is brought into life so as to balance the battery cells (balancing).

In general, the sensor 26 serves into record the preload force on bolted joints, in particular those for fixing or fastening components within a battery module or a battery pack, and through which current flows. Here these components can take the form of bus bars, battery cell terminals, battery module terminals or battery pack terminals, as well as those for the mounting of battery modules in a battery housing, the fixation of high-voltage fuses within a battery housing, or the mounting of high-voltage plug connectors. Moreover, the inventive method can be used to monitor the mounting of a battery pack on a vehicle body.

The invention claimed is:

1. A battery module containing a plurality of battery cells electrically connected to one another in series or in parallel, two contact surfaces (14a, 14b) for tapping off a module voltage of the battery module (10), and with at least one bolted joint device (22) for fixing a component (12) of the battery module (10), characterized in that the at least one bolted joint device (22) has a sensor (26) for determining a preload force applied to the bolted joint device (22).

2. The battery module according to claim 1, characterized in that the sensor (26) is an ultrasound sensor, wherein a sound-generating and/or sound-measuring unit of the sensor (26) is located in physical contact with a surface of the bolted joint device (22).

3. The battery module according to claim 1, wherein the component (12) is a cell connector (12) for electrical connection of two battery cells of the battery module (10), a bus bar of the battery module (10), or a contact surface (14a, 14b) of the battery module (10).

4. The battery module according to claim 1, characterized in that a battery controller (20) is furthermore provided, which is in a signal-conducting connection with the sensor (26), and which has means for determining, on the basis of measurement signals received from the sensor (26), and on the basis of a stored correlation between possible sensor signals and an associated preload force, the actual preload force present on the bolted joint, produced by way of the bolted joint device (22).

5. The battery module according to claim 1, characterized in that a plurality of bolted joint devices (22) are provided, to each of which is assigned a sensor (26), to which is assigned a unique identifier, in particular a data matrix code.

6. The battery module according to claim 5, characterized in that an analogue/digital converter is provided in the signal-conducting connection between the sensor (26) and the battery control unit, which converter translates analogue measurement signals provided by the sensor (26) into digital signals, and transmits them to the battery control unit.

7. A method for the operation of battery module according to claim 1, the method comprising using the sensor (26) to check the preload force on a bolted joint effected by means of the bolted joint device (22), and, if the preload force falls below a predefined minimum value, issuing a fault message and/or switching the battery off.

8. The method according to claim 7, characterized in that the preload force is determined by means of an ultrasound sensor, the measurement signals of which are transmitted to a separate battery control unit.

9. The method according to claim 7, characterized in that an analogue measurement signal is first generated, which is translated by means of an analogue/digital converter into a digital measurement signal, which is fed to a battery control unit by way of a data bus.

10. The method according to claim 9, characterized in that an identifier of the sensor (26) generating the measurement signals is transmitted with the measurement signals.

11. The method according to claim 7, characterized in that a temperature compensation of the sensor signal takes place on the basis of the sensor signal and a measured temperature.

12. The method according to claim 7, further comprising using the battery module in batteries with an operating voltage of >48 volts in mobile or stationary applications.

13. The method according to claim 7, characterized in that the preload force is determined by means of an ultrasound sensor, the power supply of which is provided by way of the battery (10), and the measurement signals of which are transmitted to a separate battery control unit with the interposition of an analogue/digital converter.

14. The battery module according to claim 1, wherein the component (12) is a current-conducting component.

15. The battery module according to claim 1, characterized in that the sensor (26) is an ultrasound sensor, wherein a sound-generating and/or sound-measuring unit of the sensor (26) is located in planar contact with a surface of the bolted joint device (22).

16. The battery module according to claim 4, characterized in that an analogue/digital converter is provided in the signal-conducting connection between the sensor (26) and the battery control unit, which converter translates analogue measurement signals provided by the sensor (26) into digital signals, and transmits them to the battery control unit.

17. The battery module according to claim 4, characterized in that an analogue/digital converter is provided in the signal-conducting connection between the sensor (26) and the battery control unit, which converter translates analogue measurement signals provided by the sensor (26) into digital signals, and transmits them to the battery control unit by way of a data bus, wherein the analogue/digital converter is integrated into a sensor control unit (20).

18. The battery module according to claim 5, characterized in that an analogue/digital converter is provided in the signal-conducting connection between the sensor (26) and the battery control unit, which converter translates analogue measurement signals provided by the sensor (26) into digital signals, and transmits them to the battery control unit by way of a data bus, wherein the analogue/digital converter is integrated into a sensor control unit (20).

* * * * *